(12) United States Patent
Masugata

(10) Patent No.: US 9,889,495 B2
(45) Date of Patent: Feb. 13, 2018

(54) TOOL FOR FASTENING BLIND RIVETS

(71) Applicant: NEWFREY LLC, Newark, DE (US)

(72) Inventor: Hiroyuki Masugata, Toyohashi (JP)

(73) Assignee: NEWFREY LLC, New Britain, CT (US)

( * ) Notice: Subject to any disclaimer, the term of this patent is extended or adjusted under 35 U.S.C. 154(b) by 0 days.

(21) Appl. No.: 14/284,725

(22) Filed: May 22, 2014

(65) Prior Publication Data

US 2014/0250649 A1    Sep. 11, 2014

Related U.S. Application Data

(63) Continuation of application No. PCT/JP2012/081458, filed on Dec. 5, 2012.

(30) Foreign Application Priority Data

Dec. 8, 2011 (JP) ................................. 2011-268837

(51) Int. Cl.
| | |
|---|---|
| *B21J 15/10* | (2006.01) |
| *B21J 15/04* | (2006.01) |
| *B21J 15/30* | (2006.01) |
| *B21J 15/02* | (2006.01) |
| *F16B 19/10* | (2006.01) |

(52) U.S. Cl.
CPC ............. *B21J 15/10* (2013.01); *B21J 15/022* (2013.01); *B21J 15/045* (2013.01); *B21J 15/105* (2013.01); *B21J 15/30* (2013.01); *F16B 19/1054* (2013.01); *Y10T 29/53774* (2015.01)

(58) Field of Classification Search
CPC ........ B21J 15/045; B21J 15/105; B21J 15/26; B21J 15/326; B21J 15/043; B21J 15/22; B21J 15/205
See application file for complete search history.

(56) References Cited

U.S. PATENT DOCUMENTS

| | | | | |
|---|---|---|---|---|
| 3,028,987 A * | 4/1962 | Hecke | ................... | B21J 15/022 29/243.529 |
| 3,107,806 A * | 10/1963 | Hecke | ................... | B21J 15/045 29/243.522 |
| 3,143,903 A * | 8/1964 | Hecke | ................... | B21J 15/022 29/243.522 |
| 3,180,017 A * | 4/1965 | Simmons | ............... | B21J 15/022 225/96 |
| 3,309,911 A * | 3/1967 | Simmons | ............... | B21J 15/043 29/243.524 |
| 3,446,509 A * | 5/1969 | Colosimo | .............. | B21J 15/045 279/57 |
| 3,605,478 A * | 9/1971 | Chirco | .................. | B21J 15/022 29/243.529 |
| 3,774,437 A * | 11/1973 | Young | ................... | B21J 15/043 29/243.526 |
| 4,248,077 A * | 2/1981 | Gregory | ................ | B21J 15/205 29/243.524 |
| 4,515,005 A * | 5/1985 | Klein | .................... | B21J 15/105 29/243.525 |

(Continued)

FOREIGN PATENT DOCUMENTS

WO    02/0975285    12/2002

*Primary Examiner* — Monica Carter
*Assistant Examiner* — Seahee Yoon
(74) *Attorney, Agent, or Firm* — Kofi A. Schulterbrandt; Michael P. Leary

(57) ABSTRACT

A blind rivet fastening tool in which the jaws are open at the original position, and at a return step in which the tool is returned to the original position after a blind rivet is fastened the fastened blind rivet is pushed out. The tool comprises a hollow nose housing for housing a mandrel; a nose piece provided at a front end of the nose housing and having an opening; a floating piece provided at a front end of the inside of the nose piece; the floating piece having a though hole in which the mandrel is inserted; a jaw guide provided at the back side of floating piece and having an inside surface which has a smaller diameter toward the front end thereof; jaws provided inside the jaw guide for holding the mandrel; a pulling head and a jaw pusher for respectively pulling back and pushing forward the jaws.

4 Claims, 5 Drawing Sheets

(56) References Cited

U.S. PATENT DOCUMENTS

| | | | | |
|---|---|---|---|---|
| 4,598,571 A * | 7/1986 | Oefinger | ................ | B21J 15/105 |
| | | | | 29/243.525 |
| 4,704,888 A * | 11/1987 | Frearson | ................ | B21J 15/105 |
| | | | | 29/243.525 |
| 4,747,738 A | 5/1988 | Duran | | |
| 4,867,625 A | 9/1989 | Dixon | | |
| 4,888,974 A * | 12/1989 | Mandell | ................ | B21J 15/105 |
| | | | | 137/613 |
| 5,073,070 A | 12/1991 | Chang | | |
| 5,131,255 A * | 7/1992 | Fushiya | ................ | B21J 15/022 |
| | | | | 29/243.526 |
| 5,351,379 A * | 10/1994 | Chu | ................ | B21J 15/043 |
| | | | | 29/243.525 |
| 5,399,053 A | 3/1995 | Duran | | |
| 5,519,926 A * | 5/1996 | Rosier | ................ | B21J 15/022 |
| | | | | 29/243.523 |
| 8,006,361 B2 * | 8/2011 | Hutter, III | ................ | B21J 15/04 |
| | | | | 29/243.518 |
| 8,443,512 B2 * | 5/2013 | Masugata | ................ | B21J 15/043 |
| | | | | 29/243.521 |
| 2001/0020322 A1 * | 9/2001 | Wille | ................ | B21J 15/105 |
| | | | | 29/243.521 |
| 2006/0090318 A1 * | 5/2006 | Toosky | ................ | B21D 39/032 |
| | | | | 29/243.518 |

\* cited by examiner

TOOL FOR FASTENING BLIND RIVETS

CROSS-REFERENCE TO RELATED APPLICATIONS

This application is a continuation of PCT/JP2012/81458, filed Dec. 5, 2012 which claims priority from Japanese Patent Application No. 2011-268837, filed Dec. 8, 2011, the disclosure of which is incorporated herein by reference in its entirety.

FIELD OF THE INVENTION

The present invention pertains to a tool for fastening blind rivets and, in particular, to a fastening tool for fastening blind rivets by deforming part of a rivet body by expanding the diameter thereof and by deforming the rivet head by squeezing the rivet head in.

BACKGROUND OF THE INVENTION

Blind rivets which are made from a hollow metal rivet body comprised of a sleeve and a rivet head at one end of a sleeve and a metal mandrel, the shaft of which extends through the through-hole of a rivet body, are well known. Blind rivets have the advantage that several mounted components can be joined by an operation on one side only.

When fastening mounted components with blind rivets, a tool for fastening blind rivets is used. The tool for fastening blind rivets is provided with a nose piece which is placed at the front end of the nose housing and which has an aperture for inserting the mandrel of the blind rivet; a jaw guide which has an inner circumferential surface which is formed so that the inner diameter thereof decreases towards the front end, and which is placed so as to be moveable forward and back in the nose housing and is contiguous with the back of the nose piece; jaws which have an outer circumferential surface which contacts slidably with the inner circumferential surface of the jaw guide, and which are placed within the jaw guide so as to grip the mandrel of the blind rivet; and a jaw pusher which pushes the jaws forward and which is placed inside the nose housing and is contiguous with the back of the jaws.

When fastening a blind rivet to a mounted component using a blind rivet fastening tool, the mandrel of the blind rivet is inserted into the aperture of the nose piece of the fastening tool; it is attached in this state, with the rivet body projecting from the nose piece. In this state, the fastening tool is positioned so that the rivet body is inserted into the mounting hole of the mounted component. Next, the fastening tool is put into operation and pulls the mandrel hard enough to break it, and the blind rivet is fastened to the mounted component by deforming the sleeve of the rivet body by expanding the diameter thereof. The broken mandrels are ejected to the back of the fastening tool and collected in a receptacle. Following this, the jaw guide returns to its starting position for attaching the next blind rivet.

There are many types of blind rivets. Blind rivets are known which fasten by pulling out the mandrel, and after expanding the diameter of one end of the sleeve of the rivet body, the rivet head is squeezed in from the outer circumference by the nose piece of the fastening tool, and the inner circumference of the rivet head engages with the shaft of the mandrel. The fastening tool for fastening this sort of blind rivet cannot increase the outer diameter of the rivet head, because the rivet head is squeezed in by means of the nose piece. For this reason, this is often used with a washer in combination. Also, because the rivet head is gripped in the aperture of the nose piece after fastening, a mechanism for pushing it out of the nose piece is necessary.

Patent Reference 1 discloses a two-component snap fastener tool which is comprised of a tubular collar and a pin component having an enlarged projecting head and a long, thin shaft, and a method of fastening with this snap fastener tool. In the two-component snap fastener of Patent Reference 1, the long, thin shaft of the pin component extends through the aperture of the work piece, and the collar is swaged into a snap retaining groove of the pin component. The shaft of the pin component shears off at a breaking neck portion groove and is fastened. The tool has a rim portion which engages in a tensioning groove of the pin, inside a tubular collet assembly which is supported so as to be capable of sliding in an anvil housing.

Patent Reference 1 discloses that a collar release component of the tool releases the collar which has been made by a swaging step. However, when the two-component snap fastener is set in the tool, it is necessary to open the rim portion of the tool so that it grips the tensioning groove.

Patent Reference 2 discloses a tool for swage-setting a fastener with a two-component structure which is comprised of a pin which passes through the concentric holes of a two-sheeted plate and a sleeve which fits together with the outside of the pin. This tool attaches an outside anvil body which engages with the guard portion of the sleeve of the fastener to a gun body which has a mechanism for gripping and pulling the pin of the fastener. The anvil at the tip of the anvil body has a center hole and carries out the swaging step.

Patent Reference 2 discloses that the pin component is ejected from a center aperture by means of an ejector component which is moveable within the housing. However, when the fastener is set on the tool, the chuck of the tool is made to contact a cap of the back surface, and it is necessary to open the chuck to do the setting.

In Patent References 1 and 2, part of the rivet body is deformed by enlarging the diameter thereof, and the rivet is fastened by deforming the rivet head by squeezing it in. Because the rivet head is squeezed in by the nose piece, it has a mechanism for kicking out the rivet head from the nose piece after fastening.

In existing tools for fastening blind rivets, a jaw guide is placed in the tip of the inside of a nose piece, and jaws are placed on an inner circumference which narrows towards the front end of the jaw guide. The jaws of the fastening tool are closed in the starting position because the jaws are pushed forward. For this reason, it is necessary to set the rivets by opening the jaws of the tool for fastening blind rivets.

If the jaws are open at the starting position, setting the rivets in such a fashion is possible and convenient. For this reason, a tool for fastening blind rivets is sought in which the jaws are open at the starting position.

PRIOR ART REFERENCES

Patent References

Patent Reference 1: Published, Unexamined Patent Application 61-144415

Patent Reference 2: Published, Examined Patent Application 53-23552

BRIEF SUMMARY OF THE INVENTION

Accordingly, the object of the present invention is to offer a tool for fastening blind rivets in which the jaws are open at the starting position, and by a return step after the blind rivet is fastened, the blind rivet is pushed out, and the tool returns to its starting position.

In order to achieve this object, a floating piece which is a single component is given a mechanism for opening and closing the jaws, and a mechanism for ejecting the rivet heads which are deformed after fastening from the nose piece; this floating piece is placed in the inside tip portion of the nose piece and is made to be moveable in the axial direction. By means of pushing the jaws to the back with the tip of the floating piece, a mechanism which opens the jaws in the starting position is made possible.

A first embodiment of the present invention is provided with a hollow nose piece for receiving the mandrel of the blind rivet which is comprised of a rivet body and a mandrel; a nose piece which has an aperture and which is placed at the tip of the nose housing; a floating piece which has a through-hole for inserting the mandrel, and is placed so as to be moveable forward and back inside the nose piece and is contiguous with the inside of the tip portion of the nose piece; a jaw guide which is contiguous with the back of the floating piece and which is placed so as to be moveable within the nose piece and the nose housing, and which has an inner circumfer-ential surface which is formed so that the inner diameter thereof decreases towards the front end; jaws which are placed inside the jaw guide to grip the mandrel which is inserted from the aperture into the nose piece, and which have an outer circumferential surface which slidably contacts the inner circumferential surface of the jaw guide; a pulling head which is connected integrally with the jaw guide and which pulls the jaw guide back relative to the aperture; and a jaw pusher which pushes the jaw forward, and which is placed inside the nose housing and is contiguous with the back of the jaws; and is a tool for fastening blind rivets characterized by the fact that it fastens a mounted component with a blind rivet by narrowing the inner diameter of the jaws by moving the jaw guide to the back relative to the aperture, and gripping the mandrel in the jaws. Moreover, when the mandrel is in a gripped state, the jaw guide and jaws are moved to the back; in this way, the diameter of a portion of the sleeve of the rivet body is enlarged, the rivet head body is squeezed in and the mandrel is broken.

In this way, the tool for fastening rivets can keep the jaws open in the starting position by means of a floating piece which is movable in the axial direction and can eject the rivet head from the nose piece after fastening. This results in an easier fastening operation.

The floating piece is symmetrical around a center axis, has a cylindrical first cylindrical portion and a flange which extends to the outside in the radial direction from the back end of the first cylindrical portion, and a cylindrical second cylindrical portion which extends from the flange to the side opposite the first cylindrical portion. It is desirable to have a through-hole which passes through to the back end portion of the second cylindrical portion from the tip of the first cylindrical portion.

In this way, the first cylindrical portion ejects the rivet body after fastening, and the flange abuts the inside tip of the nose piece; the second cylindrical portion pushes the jaws to the back, opening them, and the through-hole is mutually connected with the mandrel, thus enabling each part to complete its respective function.

In the starting position of the tool for the fastening of blind rivets, the first cylindrical portion of the floating piece is placed in the aperture of the nose piece, and by means of the floating piece which is placed between the outer circumferential portion of the flange and the tip of the nose housing, the flange is pushed forward and abuts the inside of the tip of the nose piece; it is preferable that the back end of the second cylindrical portion abut the front end of the jaws, and by pushing the jaws backward, the jaws are kept in an open state.

In the fastening step, when the rivet head of the rivet body is pulled into the aperture of the nose piece, the first cylindrical portion of the floating piece is pushed into the interior of the nose piece from a position inside the aperture; in the return step after completion of the fastening operation, it is preferable that the jaw guide push the flange of the floating piece forward, and the first cylindrical portion of the floating piece pushes out the rivet head of the rivet body which is in the aperture to the front; the first cylindrical portion enters into the interior of the aperture, and the tool returns to the starting position.

In this way, the floating piece can push out the rivet head of the rivet body when the tool returns to the starting position.

In a second embodiment of the present invention, a floating piece which is symmetrical around a center axis and which has a cylindrical first cylindrical portion; a flange which extends outward in the radial direction from the back end of the first cylindrical portion; and a second cylindrical portion which extends from the flange to the side opposite of the first cylindrical portion; and which is characterized by being formed with a through-hole which extends from the tip of the first cylindrical portion to the back end of the second cylindrical portion; and which is contiguous with the inside of the tip of the nose piece, and is placed so as to be moveable forward and back in the nose piece, is used in a tool for fastening blind rivets which is provided with a hollow nose housing; a nose piece which is placed at the front end of the nose housing and which has an aperture; a jaw guide which has an inner circumferential surface formed so that the inner diameter thereof decreases towards the front end; jaws which have an outer circumferential surface which slidably contacts the inner circumferential surface of the jaw guide; a pulling head which pulls the jaw guide to the back; and a jaw pusher which pushes the jaws forward.

In this way, it is possible to obtain a component which can be used in a tool for fastening blind rivets and which carries out two functions: the function of maintaining the jaws open in the starting position, and the function of ejecting the rivet heads from the nose piece after fastening.

It is preferable to form the back end of the second cylindrical portion as an oblique surface which can abut the oblique surface of the tip of the jaws.

In this way, the floating piece can push and widen the jaws outward in a smooth fashion.

With the present invention, it is possible to obtain a tool for fastening blind rivets in which the jaws are open at the starting position, and during the return step after the fastening of the blind rivet, the blind rivet is pushed out, and the tool returns to its starting position.

DETAILED DESCRIPTION OF THE INVENTION

Next, embodiments of the present invention will be explained with reference to the drawings. Before explaining the fastening tool in the embodiments of the present invention, the blind rivet which is fastened will be explained.

Figure 1:
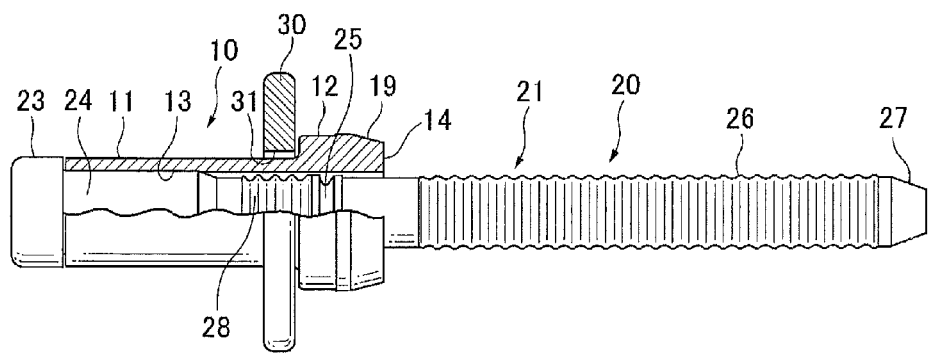
FIG. 1 is a front elevation showing part of a blind rivet in cross-section, before fastening with the tool for fastening blind rivets in the embodiment of the present invention.

FIG. 1 is a front elevation which shows in cross-section a portion of the blind rivet which is fastened by means of the tool for fastening blind rivets in the embodiment of the present invention (referred to below as 'the fastening tool'). The blind rivet includes a rivet body 10 and a mandrel 20. Moreover, it is assembled with a washer 30. Mandrel 20 is inserted in a through-hole 13 of rivet body 20 from the sleeve side end of rivet body 10, and the mandrel head 23 of mandrel 20 is placed so as to be contiguous with the sleeve side end of rivet body 10. Moreover, washer 30 is inserted on the outer circumference of sleeve 11 from the sleeve side end of rivet body 10, and is placed so as to be contiguous with rivet head 12.

First, rivet body 10 will be explained. Rivet head 10 includes a cylindrical sleeve 11 and a rivet head which is formed on one end of sleeve 11, and which has a diameter larger than sleeve 11. The outer diameter of the tip of rivet head 12 decreases in a tapered-fashion and becomes an oblique surface 19; it ends in rivet head side end 14. When the blind rivet is fastened, oblique surface 19 is squeezed in from its outer circumference by nose piece 51 of the fastening tool for fastening blind rivets, and the outer diameter and the inner diameter decrease.

A through-hole 13 extends between the rivet head side end 14 of rivet body 10 and the sleeve side end. Although the inner diameter of through-hole 13 is large enough for shaft 21 of mandrel 20 to be inserted, it is smaller than the outer diameter of head 23 of mandrel 20, and head 23 is stopped when it abuts the sleeve side end.

The outer diameter of sleeve 11 is smaller than the inner diameter of the mounting holes of the mounted component, and is small enough to pass through the mounting holes.

Next, mandrel 20 will be explained. Mandrel 20 is provided with a long, thin shaft 21 and a head 23 on one end of a shaft 21. The outer diameter of head 23 is larger than the inner diameter of through-hole 13 of rivet body 10. The outer diameter of head 23 is smaller than the inner diameter of the mounting holes of mounted components 41 and 42 and can pass through the mounting holes. Shaft 21 has a cylindrical shape and has an outer diameter smaller than the inner diameter of through-hole 13 of rivet body 10; it can be inserted in through-hole 13. Shaft 21 is longer than the length of through-hole 13 of rivet body 10, and when the shaft 21 of mandrel 20 is inserted in the through-hole 13 of rivet body 10, the tip of shaft 21 projects from the rivet head side end 14 of rivet body 10.

The shaft 21 of mandrel 20 includes, from the side of head 23, a columnar portion 24, a locking portion 28, a breaking portion 25, a gripping portion 26 and a tip 27. Contiguous with the head 23 is a columnar portion 24.

A locking portion 28 is contiguous with columnar portion 24. Spaced circumferential grooves are formed on the circumference of locking portion 28, and between the circumferential grooves are locking ridges. When the blind rivet is fastened, part of rivet head 12 is squeezed in from the outer circumference by the nose piece 51 of the fastening tool for fastening blind rivets so the inner diameter becomes smaller, and the locking ridges engage in the inner circumference of through-hole 13, the diameter of which has become smaller, and a strong crimping force is produced, so that mounted components 41 and 42 are fastened strongly.

Contiguous with locking portion 28 is a breaking portion 25 which has an outer diameter which is smaller than that of locking portion 28. When the blind rivet is in an assembled state, breaking portion 25 is contained in through-hole 13 of rivet body 10. Breaking portion 25 is the portion which breaks when the shaft 21 of mandrel 20 is pulled by the fastening tool, and a certain pull strength is exceeded.

A gripping portion 26 is contiguous to breaking portion 25 and has a diameter larger than that of breaking portion 25. Multiple locking grooves are formed at gripping portion 26 so that when it is gripped by jaws 54, it does not slip. The end of the tip portion 27 of shaft 27 narrows so as to be easily inserted in the fastening tool for fastening blind rivets.

There are many cases in which a blind rivet is used in combination with a washer 30 so that the rivet corresponds to the mounting holes of the mounted components. Washer 30 is not an essential part of the present invention and may be omitted. Washer 30 will now be explained. Washer 30 is a disc-shaped component, and at a central portion in the axial direction, a center hole 31 opens which has a circular cross-section. The inner diameter of center hole 31 is slightly larger than the outer diameter of head 23 of mandrel 20 and is slightly larger than the outer diameter of sleeve 11, and is smaller than the outer diameter of the rivet head; and in the blind rivet in which the mandrel 20 and rivet body 10 are assembled, washer 30 can be inserted on the outer circumference of sleeve 11 from the side of head 23 of mandrel 20.

Figure 2:
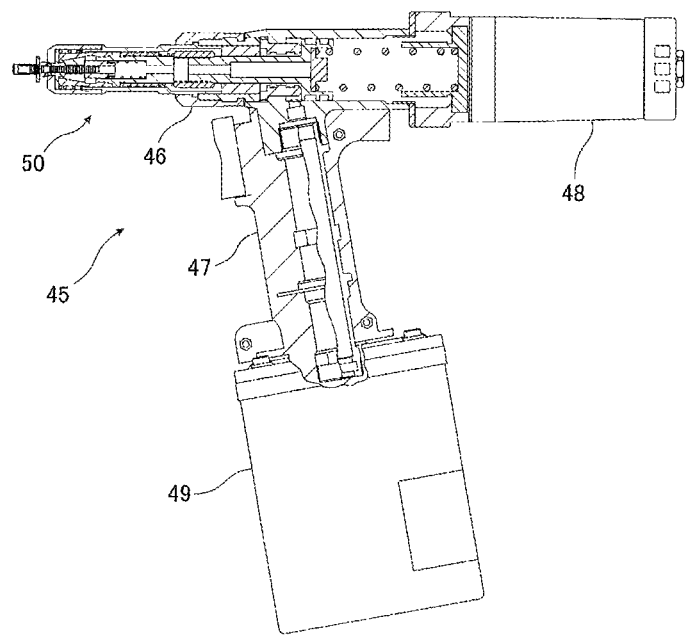
FIG. 2 is a front elevation of the tool for fastening blind rivets in an embodiment of the present invention.

Next, the fastening tool according to an embodiment of the present invention will be explained. FIG. 2 is an oblique view which shows the entirety of one example of the fastening tool 45 used in the present invention. Fastening tool 45 uses compressed air as the drive source. Fastening tool 45 is provided with a sealed housing 46; a handle 47 which is held by the operator; an air pressure generating device 49 for generating compressed air; a receptacle 48 for collecting the broken mandrels; and a nose 50. A trigger lever is attached to handle 47 for operating the fastening tool for fastening blind rivets.

In the embodiment of the present invention, although an example is shown which is driven by compressed air, if jaws 54 which grip mandrel 20 can be pulled to the back of nose 50 in a strong manner, hydraulics, an electric motor, or other drive means can be used. There are various positions and configurations for the sealed housing 46, air pressure generating device 49 and the receptacle 48. The present invention pertains to a portion of the nose 50, and the entire structure of the fastening tool is not limited to what is shown in FIG. 2. Because the entire structure of the fastening tool is well known, it will not be described here in detail.

Figure 3:
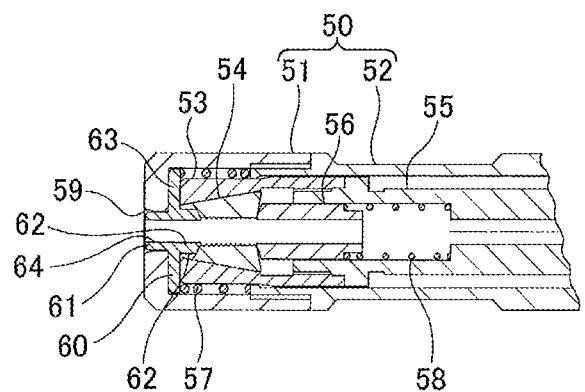
FIG. 3 is an enlarged cross-section of the nose portion of the tool for fastening blind rivets.

FIG. 3 is an enlarged cross-sectional diagram of the nose 50 of the tip of fastening tool. FIG. 3 shows part of nose 50 in the starting position before attaching the blind rivet. A hollow nose 50 is placed at the tip of fastening tool 45 for receiving the blind rivets. Nose 50 is comprised of a hollow nose housing 52 and a nose piece 51 which is integrally connected with the front end portion of nose housing 52. Nose housing 52 is cylindrical. Nose piece 51 is cylindrical, and at its end, it has an aperture 59 for inserting mandrel 20 of the blind rivets.

In this Specification, the direction of the tip of nose piece 51 (towards the left in FIG. 3) is called the forward direction, and the direction of the nose housing 52 (towards the right in FIG. 3) is called the back direction. Also, for each structural component, the left side of FIG. 3 is called the tip portion, and the right side is called the back end portion.

Figure 4:
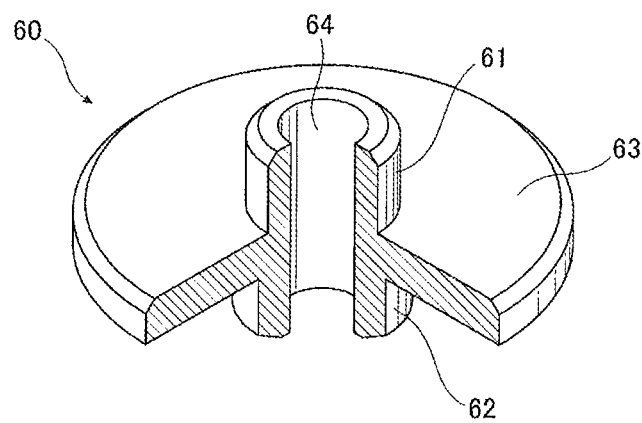
FIG. 4 is a cutaway oblique view of portion of the floating piece in the nose of FIG. 3.

A floating piece 60 is placed on the inside of the forward portion of nose piece 51. FIG. 4 is a cutaway oblique view of a portion of floating piece 60. Floating piece 60 is a component which is unique to the present invention. Floating piece 60 is provided with a cylindrical first cylindrical portion 61, a flange 63 which extends outward in the radial direction from the back end of first cylindrical portion 61 and a second cylindrical portion 62 which extends from flange 63 in a direction opposite to the first cylindrical portion 61. The outer diameter of the first cylindrical portion 61 is slightly smaller than the inner diameter of aperture 59 of nose piece 51 and can be inserted in aperture 59. A through-hole 64 is formed which passes through first cylindrical portion 61, second cylindrical portion 62 and flange 63. The inner diameter of through-hole 64 is slightly larger than the outer diameter of the shaft of mandrel 20 and can receive the shaft of mandrel 20. The outer diameter of flange 63 is slightly smaller than the inner diameter of the cylindrical portion of nose piece 51 and can be received in nose piece 51.

In FIG. 4, the back end of the second cylindrical portion 62 is an oblique surface, and although it is preferable to have this abut the oblique surface of the tip of jaw 54, a planar surface may be used instead of an oblique surface.

A floating piece spring 57 comprised of a coil spring is placed between the outer circumference of flange 63 of floating piece 60 and the front end of nose housing 52, which pushes floating piece 60 forward. In this way, one surface of flange 63 of floating piece 60 abuts the inner surface of the end portion of nose piece 51.

In the starting position for fastening tool 45, one surface of flange 63 abuts the inner surface of the end portion of nose piece 51, and the first cylindrical portion 61 is positioned in aperture 59 of nose piece 51, and the second cylindrical portion 62 extends in the axial direction inside nose piece 51 and abuts the end surface of jaws 54. Floating piece 60 can slide in the axial direction inside nose piece 51.

A tubular jaw guide 53 is contained on the inside of nose piece 51 which abuts one surface of flange 63 of floating piece 60 and can slide in the axial direction relative to nose piece 51.

Jaws 54 are contained in jaw guide 53 so as to slide in the axial direction relative to jaw guide 53. Jaws 54 are placed so that their tip abuts the back end portion of the second cylindrical portion 62 and are formed with a narrow, pointed configuration towards floating piece 60. Jaws 54 are divided into 2-4 parts in the circumferential direction within jaw guide 53, and are assembled within jaw guide 53 to form a tubular structure. Each jaw forms a space for receiving the mandrel 20 of the blind rivet inside the assembled tubular structure.

Jaw guide 53 matches jaws 54 and is formed so as to have tapered cavities which have an inner diameter which decreases towards the front (towards the left in FIG. 3). Jaws 54, which are assembled so as to form a tubular structure with a narrow tip, are received in these tapered cavities so as to be slidable in the axial direction. Accordingly, when jaw guide 53 is forward in the axial direction relative to jaws 54 (the left-hand side of FIG. 3), it is possible to enlarge the diameter of the space inside the tubular structure formed by the multiple jaws 54; in this way, the mandrel 20 of the blind rivet can be easily received and held. Conversely, when jaw guide 53 is towards the back in the axial direction relative to jaws 54 (right-hand side of FIG. 3), the diameter of the space inside the tubular structure formed by the multiple jaws 54 is decreased; in this way, the mandrel 20 of the blind rivet which was received in the space is held and maintained.

In the starting position, because the tip of jaws 54 is pushed towards the back by means of the back end portion of the second cylindrical portion 62 of floating piece 60, jaws 54 are in the open state.

A tubular pulling head 55 is connected integrally at the back of jaw guide 53 by means of a screw connection. Although pulling head 55 (and jaw guide 53) can slide in the axial direction within sealed housing 46, it cannot rotate around the axis. A tubular drive shaft is connected at the back end of pulling head 55.

A hollow tubular jaw pusher 56 is placed inside the jaw guide 53 and the pulling head 55 at the back of jaws 54, which pushes jaws 54 forward. A jaw pusher spring 58 comprised of a coil spring is placed between the back end of jaw pusher 56 and the inside of the forward portion of pulling head 55 in order for jaw pusher 56 to push jaws 54 forward. Jaw pusher 56 is normally biased to push forward, and jaws 54 are pushed to the forward side. In this way, jaws 54 are normally pressed towards floating piece 60 in nose piece 51; and the outer surface of jaws 54, which has a narrow-tipped configuration, is made to abut the tapered inner surface of the interior of jaw guide 53. The tip of jaw pusher 56 has an oblique surface and abuts the oblique surface of the back end of jaws 54. The oblique surface of the back end portion of the second cylindrical portion 62 and the oblique surface of jaw pusher 56 work together to push jaws 54 to the outside and widen them; and the diameter inside the space inside the tubular structure formed by the multiple jaws is increased.

When jaw guides 53 are on the forward side in the axial direction relative to jaws 54, the diameter of the space inside the tubular structure formed by the multiple jaws 54 increases, and the mandrel 20 of the blind rivet is easily received. Conversely, when jaw guides 53 are on the back side in the axial direction relative to jaws 54, the diameter of the space inside the tubular structure formed by the multiple jaws 54 decreases, and the mandrel 20 of the blind rivet which is received and held in the space is normally held by the elasticity of the jaw pusher spring 58.

The fastening operation for the mounted components 41 and 42 by blind rivets using the fastening tool in the embodiments of the present invention in FIGS. 2 and 3 will now be explained, with reference to FIGS. 5-13.

Figure 5:
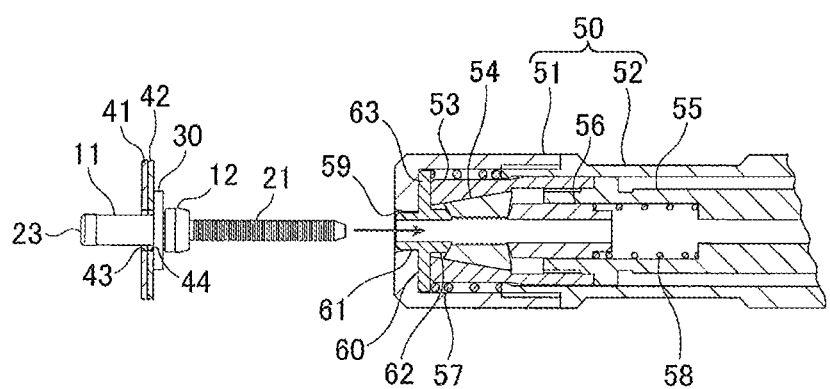
FIG. 5 is a cross-sectional diagram which shows the appearance before the blind rivet is set in the fastening tool by the fastening tool of FIG. 3.

FIG. 5 is a cross-sectional diagram which shows the appearance of the starting position, with the blind rivet set in the mounting holes 43 and 44 of mounted components 41 and 42, before it is set in the fastening tool. The left-hand side of FIG. 5 is the blind side, and the operation for attaching the blind rivet is done from the right-hand operation side.

In the starting position shown in FIG. 5, floating piece 60 abuts the inside of the end portion of nose piece 51, and jaw guide 53 is at the front of nose housing 52, and jaws 54 are pushed to the back by means of the second cylindrical portion 62 of floating piece 60. For this reason, jaws 54 are open, and because the inner diameter of jaws 54 increases, it is possible to insert mandrel 20 of the blind rivet at the starting position.

Figure 6:
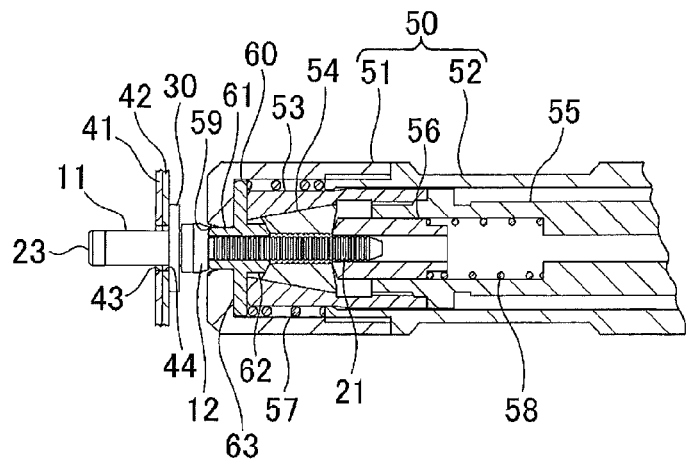
FIG. 6 is a cross-sectional diagram which shows the appearance when the blind rivet is set in the fastening tool by the fastening tool of FIG. 3.

FIG. 6 is a cross-sectional diagram showing the step in which mandrel 20 of the blind rivet is inserted. In FIG. 6, the mandrel 20 of the blind rivet passes through a through-hole 64 of floating piece 60 which is in the aperture 59 of nose piece 51; and is inserted between jaws 54, which are open. The inserted mandrel 20 is maintained in through-hole 64 of floating piece 60 by means of suctioning by air pressure.

Nose piece 51 is constructed so that only mandrel 20 is received in through-hole 64 of floating piece 60, the rivet head 12 of rivet body 10 being stopped and held by nose piece 51.

Figure 7:
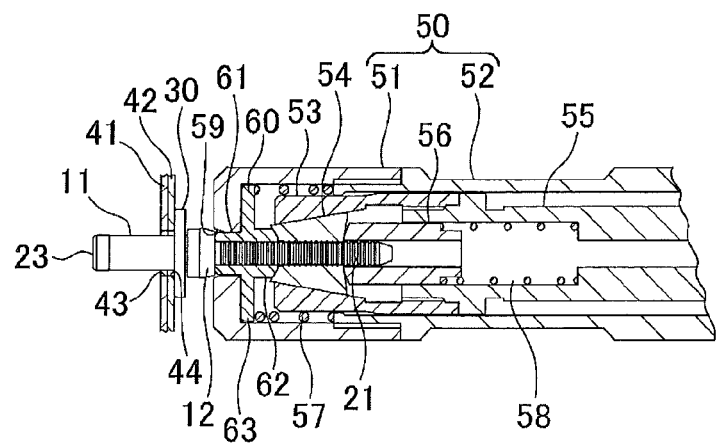
FIG. 7 is a cross-sectional diagram which shows the beginning step in fastening the blind rivet.

FIG. 7 is a cross-sectional diagram showing the step in which the fastening of the blind rivet at the fastening tool is commenced. When the trigger is on, jaw guide 53 and pulling head 55 move integrally in the backwards direction. Floating piece 60 is kept in the starting position by being pressed by floating piece spring 57. When jaw guide 53 moves in the backwards direction, the outer circumference of jaws 54 are pressed by jaw guide 53 and close, gripping the shaft 21 of mandrel 20.

Figure 8:
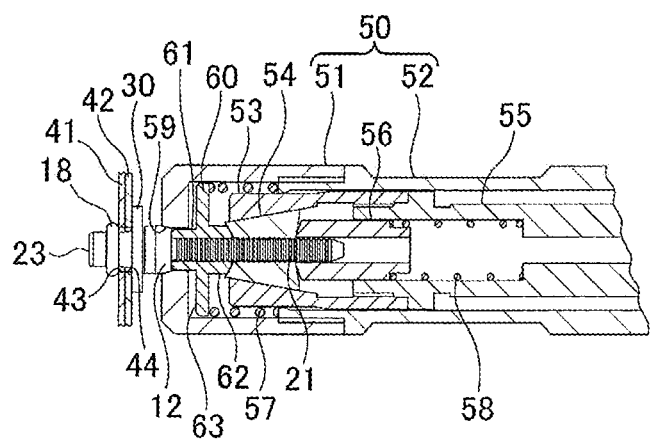
FIG. 8 is a cross-sectional diagram which shows the intermediate step in fastening the blind rivet.

FIG. 8 is a cross-sectional diagram which shows an intermediate step in fastening a blind rivet at the fastening tool. As shown in FIG. 8, when jaw guide 53 moves to the back, the oblique surface 19 which is near to the tip of rivet head 12 of rivet body 10 is held by nose piece 51, and the gripping portion 26 of mandrel 20 is gripped by jaws 54 and pulled in the backward direction. The head 23 of mandrel 20 is crushed by the sleeve side end portion of sleeve 11 of rivet body 10, forming enlarged diameter portion 18. Nose piece 51 pushes the oblique surface 19 of rivet head 12 from the outer circumference, deforming rivet head 12 so that the outer diameter of its outer circumference decreases, and rivet head 12 enters into the aperture 59 of nose piece 51. Rivet head 12 then pushes the end surface of the first cylindrical portion 61 of floating piece 60, and this force overcomes the pushing force of floating piece spring 57, and the surface of flange 63 of floating piece 60 is made to separate from the surface of nose piece 51.

Figure 9:
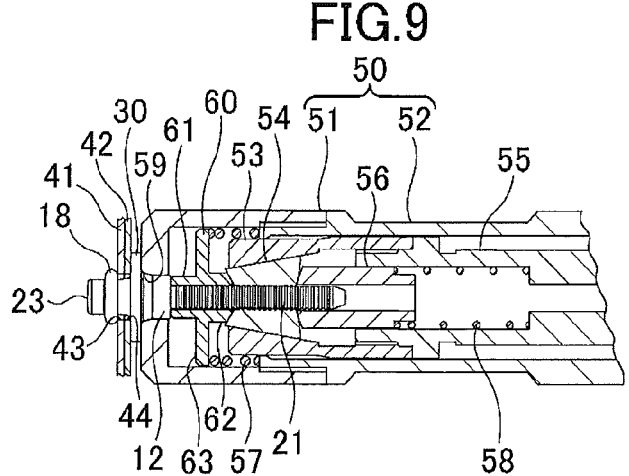
FIG. 9 is a cross-sectional diagram which shows a further step in the fastening operation for the blind rivet.

FIG. 9 is a cross-sectional diagram showing a step in which the fastening operation has advanced further, and the gripping portion 26 of mandrel 20 has again been pulled out. While nose piece 51 pushes again on the oblique surface 19 of rivet head 12 from the outer circumference, the outer circumference of rivet head 12 is deformed so that its outer diameter decreases. The inner circumference of through-hole 13 of the inside of rivet head 12 is then deformed so that its inner diameter decreases, and it engages in locking portion 28 of mandrel 20.

If the surface around aperture 59 of the tip of nose piece 51 abuts the surface of washer 20, rivet head 12 cannot be pulled further into nose piece 51. The blind rivet clamps mounted components 41 and 42 between the enlarged diameter portion 18, which has an enlarged diameter, and washer 30. By doing so, the blind rivet fastens mounted components 41 and 42. The first cylindrical portion 61 of floating piece 60 is then pushed from aperture 59 into nose piece 51 by rivet head 12.

Figure 10:
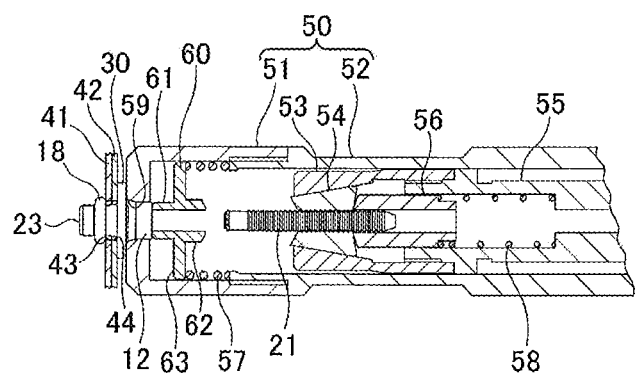
FIG. 10 is a cross-sectional diagram which shows the stage in which the mandrel is broken.

FIG. 10 is a cross-sectional diagram which shows the step in which jaws 54 grip the gripping portion 26 of mandrel 20 and pull again, breaking mandrel 20. The blind rivet is fastened to mounted components 41 and 42, mandrel 20 is broken at breaking portion 25, and it remains at the fastened part from the breaking portion 25 to the head 23 side. Floating piece 60 is pushed forward by the pushing force of floating piece spring 57, and the end surface of the first cylindrical portion 61 of floating piece 60 abuts the rivet head side end 14 of rivet body 10. The shaft 21 of mandrel 20 remains gripped in jaws 54 from the breaking portion 25 to the tip portion side and moves towards the back, exiting at the back through through-hole 64 of floating piece 60.

Figure 11:
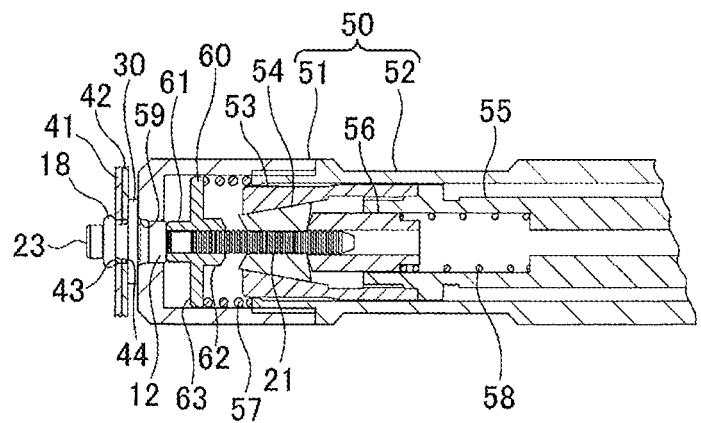
FIG. 11 is a cross-sectional diagram which shows the return step after fastening the blind rivet.

FIG. 11 is a cross-sectional diagram showing the return step. In FIG. 11, because mandrel 20 is broken, when the trigger is off, jaw guide 53 and pulling head 55 move integrally to the front (towards the left in the diagram). The shaft 21 of mandrel 20 is gripped by jaws 54 from the breaking portion 25 to the tip portion side and moves with the jaws.

Figure 12:
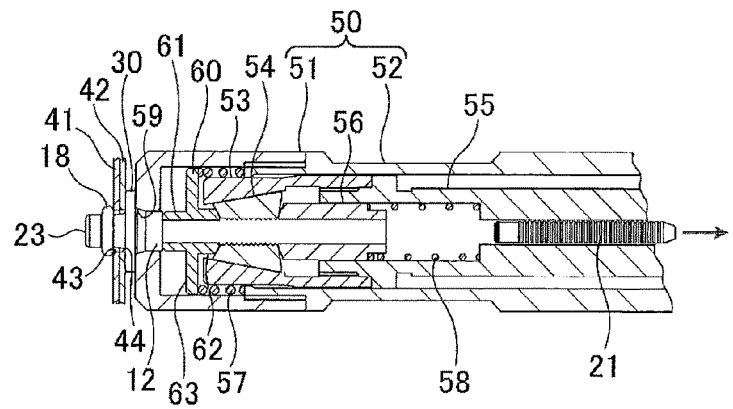
FIG. 12 is a cross-sectional diagram which shows a further step in the return after fastening the blind rivet.

FIG. 12 is a cross-sectional diagram which shows a further return step. In FIG. 12, although floating piece 60 abuts the rivet head side end 14 of rivet body 10, the force needed to push out rivet head 12 of rivet body 10 is greater than the force of jaw pusher spring 58 which pushes on jaws 54. As a result, floating piece 60 does not push out rivet head 12, and even though jaw guide 53 moves forward, the second cylindrical portion 62 enters into and is contained in jaw guide 53, with floating piece 60 in an inactive state. The end surface of the second cylindrical portion 62 then pushes on jaws 54 and is made to move to the back relative to jaw guide 53, opening jaws 54. By means of opening jaws 54, shaft 21 of mandrel 20 is released from the breaking portion 25 to the tip side, and being suctioned by air, goes towards to receptacle 48.

Figure 13:
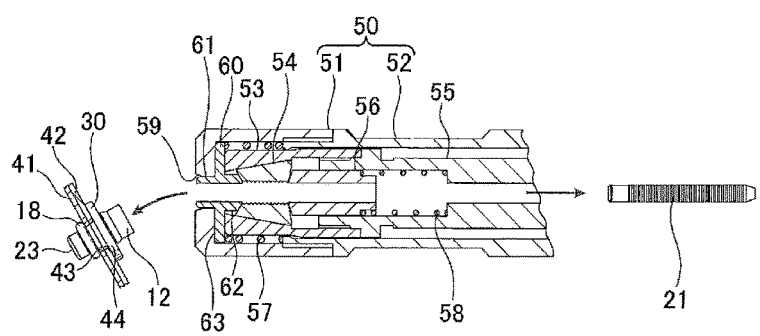
FIG. 13 is a cross-sectional diagram which shows the appearance when the fastening tool has returned to the starting position.

FIG. 13 is a cross-sectional diagram which shows the appearance when the device is returned to the starting position. In FIG. 13, the end surface of jaw guide 53 abuts flange 63 of floating piece 60, and by means of the high return force of jaw guide 53, floating piece 60 pushes on rivet head side end 14 of rivet body 10, and the fastened blind rivet is pushed out from nose piece 51. In FIG. 13, the mounted components 41 and 42 and the blind rivet are shown falling away, but if mounted components 41 and 42 are fastened, the blind rivet is pushed out while withdrawing the fastening tool.

Jaws 54 are then pushed back by the end surface of the second cylindrical portion 62 of floating piece 60, and are open. In this way, the device returns to the starting position and the fastening operation is completed. Because jaws 54 are open in the starting position, it is possible to carry out the next blind rivet fastening operation in the starting position.

The floating piece 60 according to the embodiments of the present invention carries out an opening and closing action of jaws 54, and an action which ejects the deformed rivet head 12 from aperture 59 of nose piece 51.

Namely, in the starting position, the second cylindrical portion 62 wins out over the force which pushes jaws 54 forward by means of jaw pusher spring 58, pushing jaws 54 back, and jaws 54 open in jaw guide 53. Following this, jaws 54 close and grip mandrel 20 by means of jaw guide 53 being pulled towards the back.

After the blind rivet has been fastened and the device returns to the starting position, the second cylindrical portion 62 pushes jaws 54 towards the back, and jaws 54 open. Also, the first cylindrical portion 61 of floating piece 60 is pushed by jaw guide 53, and pushes out rivet head 12 of rivet body 10 of the fastened blind rivet from aperture 59 of nose piece 51.

Figure 14:
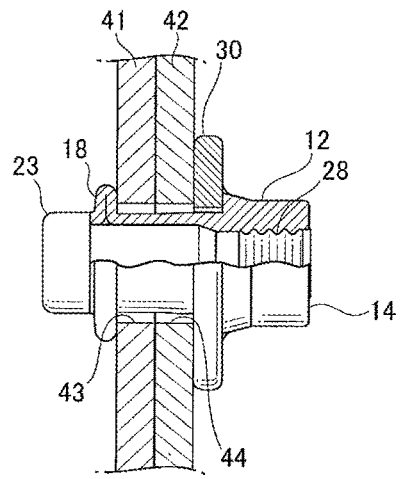
FIG. 14 is a front elevation which shows part of the fastened portion after fastening the blind rivet, in cross-section.

FIG. 14 is a front elevation with a portion of the rivet body 10 pushed out from nose piece 51 shown in cross-section. Mounted components 41 and 42 are fastened between the enlarged diameter portion 18 of rivet body 10 and washer 30.

Mandrel 20 remains on the fastened part from the breaking portion 25 to the head 23. The diameter of the sleeve side end portion of rivet body 10 is enlarged by means of the head 23 of mandrel 20, and because the inner circumference of rivet head 12 of rivet body 10 which has been squeezed in by nose piece 51 engages with the locking portion 28 of mandrel 20, a secure fastening is possible.

According to the embodiments of the present invention, a tool for fastening rivets has a floating piece 61 inside the front end of a nose piece 51. In the starting position, part of floating piece 60 is positioned in aperture 59, and by means of another part of floating piece 60 pushing jaws 54 to the back, jaws 54 open, and it is possible to receive mandrel 20 in jaws 54.

Also, in the return step to the starting position after completion of fastening, another part of floating piece 60 again opens jaws 54, and part of floating piece 60 ejects rivet head 12 of rivet body 10 from aperture 59 of nose piece 51; and part of floating piece 60 enters into aperture 59, and the tool returns to the starting position.

In this way, the floating piece carries out the action of opening and closing the jaws, and the action of ejecting the fastened rivet head from the nose piece, with one component.

Because the jaws are open in the starting position, it is possible to set the rivet in the starting position.

The invention claimed is:

1. A tool for fastening mounted components together with blind rivets, the blind rivets including a rivet body and a mandrel, the tool comprising: a hollow nose housing for receiving a mandrel of a blind rivet; a nose piece which is placed at a tip of the nose housing and which has an aperture; a floating piece which has a through-hole for inserting a mandrel and which is placed so as to be moveable forward and back within the nose piece, and which is contiguous with an inside of a tip of the nose piece; a floating piece spring between the floating piece and the hollow nose housing and contacting the floating piece and hollow nose housing for pushing the floating piece forward; a jaw guide with an inner circumferential surface which is formed so that an inner diameter of the jaw guide decreases towards a front and which is placed so as to be moveable forward and back within the nose piece and the nose housing, and which is contiguous with a back of the floating piece; jaws which have an outer circumferential surface which slidably contacts the inner circumferential surface of the jaw guide, and which is placed within the jaw guide so that the jaws grip the mandrel inserted into the nose piece from the aperture; a pulling head which is integrally connected to the jaw guide, and which pulls the jaw guide back relative to the aperture; and a jaw guide pusher which is placed in the nose housing and is contiguous with a back of the jaws, and which pushes the jaws forward; and wherein mounted components are fastened with blind rivets by narrowing an inner diameter of the jaws by moving the jaw guide backwards relative to the aperture, gripping the mandrel in the jaws, enlarging a diameter of a portion of the sleeve of the rivet body by again moving the jaw guide and jaw backwards while the mandrel is in a gripped state, and squeezing in the rivet head of the rivet body and breaking the mandrel.

2. The tool of claim 1, wherein the floating piece is symmetrical around a center axis and has a cylindrical first cylindrical portion; a flange which extends outward in a radial direction from a back end of the first cylindrical portion; and a cylindrical second cylindrical portion which extends from the flange to a side opposite the first cylindrical portion; and the through-hole extends from a tip of the first cylindrical portion to a back end of the second cylindrical portion.

3. The tool of claim 2, wherein during a starting position for the tool for fastening blind rivets, the flange abuts the inside of the tip of the nose piece; and the back end of the second cylindrical portion abuts a front end of the jaws, and pushing the jaws backwards, keeps the jaws in an open state.

4. The tool of claim 3, wherein during a fastening step, when the rivet head of the rivet body is pulled into the aperture of the nose piece, the first cylindrical portion of the floating piece is pushed into a interior of the nose piece from a position within the aperture; and during a return step after the fastening operation is completed, the jaw guide pushes the flange of the floating piece forward, and the first cylindrical portion of the floating piece ejects the rivet head of the rivet body which is in the aperture to a front; and the first cylindrical portion enters the aperture, and the tool returns to the starting position.

* * * * *